(12) United States Patent
Kitahara et al.

(10) Patent No.: US 10,051,270 B2
(45) Date of Patent: Aug. 14, 2018

(54) VIDEO ENCODING METHOD USING AT LEAST TWO ENCODING METHODS, DEVICE AND COMPUTER PROGRAM

(71) Applicant: NIPPON TELEGRAPH AND TELEPHONE CORPORATION, Tokyo (JP)

(72) Inventors: Masaki Kitahara, Yokosuka (JP); Atsushi Shimizu, Yokosuka (JP); Ken Nakamura, Yokosuka (JP); Seisuke Kyochi, Yokosuka (JP); Naoki Ono, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 718 days.

(21) Appl. No.: 14/368,466

(22) PCT Filed: Jan. 22, 2013

(86) PCT No.: PCT/JP2013/051193
§ 371 (c)(1),
(2) Date: Jun. 24, 2014

(87) PCT Pub. No.: WO2013/111747
PCT Pub. Date: Aug. 1, 2013

(65) Prior Publication Data
US 2015/0010061 A1    Jan. 8, 2015

(30) Foreign Application Priority Data

Jan. 26, 2012   (JP) ................................ 2012-014062

(51) Int. Cl.
*H04N 19/10*   (2014.01)
*H04N 19/18*   (2014.01)
(Continued)

(52) U.S. Cl.
CPC ......... *H04N 19/107* (2014.11); *H04N 19/115* (2014.11); *H04N 19/152* (2014.11);
(Continued)

(58) Field of Classification Search
None
See application file for complete search history.

(56) References Cited

U.S. PATENT DOCUMENTS 5,001,559 A    3/1991   Gonzales et al.
5,929,916 A *  7/1999   Legall ................. H04N 19/176
                                                 375/240.05
(Continued)

FOREIGN PATENT DOCUMENTS

CN   101080014 A   11/2007
EP   1 672 930 A2   6/2006
(Continued)

OTHER PUBLICATIONS

Office Action, Canadian Patent Application No. 2,862,701, dated Dec. 4, 2015.
(Continued)

*Primary Examiner* — Kevin McInnish
(74) *Attorney, Agent, or Firm* — Harness, Dickey & Pierce, P.L.C.

(57) ABSTRACT

In an intra-picture, a predetermined region is set as a normal encoding region, and a region other than the predetermined region is set as a simplified encoding region. In a subsequent picture, the normal encoding region is set as a larger region including a normal encoding region of a previous picture, and a region other than the normal encoding region is set as a simplified encoding region. In each picture, normal encoding is performed on a block of the normal encoding region, and simplified encoding in which a generated code amount and a computation amount are smaller than in the normal (Continued)

encoding is performed on a block of the simplified encoding region.

7 Claims, 11 Drawing Sheets

(51) Int. Cl.
*H04N 19/107* (2014.01)
*H04N 19/115* (2014.01)
*H04N 19/176* (2014.01)
*H04N 19/152* (2014.01)
*H04N 19/167* (2014.01)
*H04N 19/132* (2014.01)
*H04N 19/124* (2014.01)

(52) U.S. Cl.
CPC ......... *H04N 19/167* (2014.11); *H04N 19/176* (2014.11); *H04N 19/124* (2014.11); *H04N 19/132* (2014.11); *H04N 19/18* (2014.11)

(56) References Cited

U.S. PATENT DOCUMENTS

| | | | |
|---|---|---|---|
| 6,256,423 B1 * | 7/2001 | Krishnamurthy | H04N 19/30 375/E7.083 |
| 2006/0171459 A1 | 8/2006 | Shen et al. | |

FOREIGN PATENT DOCUMENTS

| | | | | |
|---|---|---|---|---|
| EP | 1672930 A2 * | 6/2006 | ........... | H04N 19/105 |
| JP | 2005-328183 A | 11/2005 | | |
| JP | 2007-267414 A | 10/2007 | | |
| JP | 2008-258953 A | 10/2008 | | |
| JP | 2009-071731 A | 4/2009 | | |
| KR | 10-2006-0065740 A | 6/2006 | | |
| TW | I244856 | 12/2005 | | |
| TW | I262024 | 9/2006 | | |
| TW | I277349 | 3/2007 | | |
| TW | I318076 | 12/2009 | | |
| WO | 2004/064373 A2 | 7/2004 | | |
| WO | WO-2011/034380 A2 | 3/2011 | | |

OTHER PUBLICATIONS

Office Action, Taiwanese Patent Application No. 102102592, dated Jan. 21, 2015.
Notice of Non-Final Rejection, Korean Patent Application No. 10-2014-7019718, Mar. 21, 2016.
Tokinobu Mitasaki et al., "Fast selection on picture adaptive frame/field coding", ITE Technical Report, Sep. 27, 2007 (Sep. 27, 2007), vol. 31, No. 42, pp. 37 to 42.
International Search Report for PCT/JP2013/051193, ISA/JP, dated Feb. 26, 2013, with English translation thereof.
Chinese Office Action for parallel application CN 20138005640.5, dated Oct. 18, 2016, with English translation.
Notice of Non-Final Rejection, Korean Patent Application No. 10-2014-7019718, dated Sep. 4, 2015.
Extended European Search Report, Patent Application No. 13740619.5, Jul. 17, 2015.

* cited by examiner

↓ MOVE SEARCH RANGE (C)

VIDEO ENCODING METHOD USING AT LEAST TWO ENCODING METHODS, DEVICE AND COMPUTER PROGRAM

CROSS REFERENCE TO RELATED APPLICATIONS

This application is a 371 U.S. National Stage of International Application No. PCT/JP2013/051193, filed Jan. 22, 2013. Priority is claimed on Japanese Patent Application No. 2012-014062, filed Jan. 26, 2012. The entire contents of the above applications are incorporated herein by reference.

TECHNICAL FIELD

The present invention relates to a video encoding method, a video encoding device, and a video encoding program for enabling a video to be encoded by performing switching between a normal encoding method and a simplified encoding method in which a generated code amount and a computation amount are small.

BACKGROUND ART

In video encoding in bidirectional communication, a size of a virtual buffer is significantly reduced to implement a low delay. Thus, in an intra-picture and an inter-picture subsequent thereto at the time of an encoding start or a scene change, buffer underflow tends to occur.

In this situation, for example, it is possible to reduce the possibility of the buffer underflow by applying technology described in Patent Document 1 at the time of intra-picture insertion and in an inter-picture subsequent thereto. In this method, when each block is encoded, normal encoding is performed when a previously accumulated generated code amount is small and simplified encoding in which the generated code amount is significantly small is forcibly performed when the previously accumulated generated code amount is large.

Here, the normal encoding is encoding using an encoding parameter (a motion vector or the like) obtained by a motion search/mode determination/quantization control or the like, and the simplified encoding is encoding using a forcibly determined parameter so that the generated code amount is reduced without using a result of the motion search/mode determination/quantization control or the like. For example, in the simplified encoding, encoding in which the motion vector is set to 0 and the quantization step is maximized is performed. That is, the simplified encoding is encoding in which the limitation of a value of the encoding parameter is greater than in the normal encoding. The encoding parameter is numerical value data serving as an encoding target, and represents a macroblock mode number, a quantization parameter, a motion vector, a prediction residual quantization value, or the like.

Figure 9:
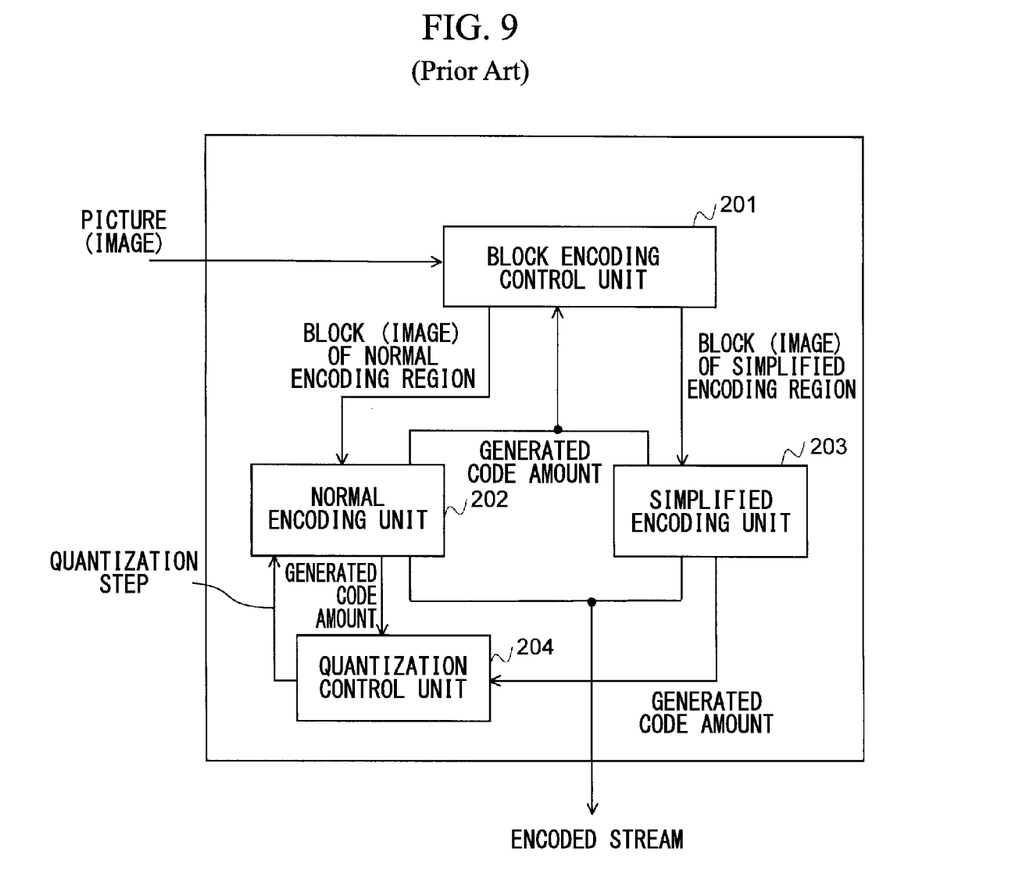
FIG. 9 is a diagram illustrating an example of a conventional video encoding device.

FIG. 9 is a diagram illustrating an example of a conventional video encoding device. When an encoding target picture (image) is input, a block encoding control unit 201 divides the picture into blocks, each of which is an encoding unit. When an accumulated generated code amount from a previously accumulated generated code amount is less than a predetermined threshold value for each division block, a normal encoding unit 202 performs normal encoding on the block. When the accumulated generated code amount is greater, a simplified encoding unit 203 performs simplified encoding on the block. A quantization control unit 204 receives notifications of generated code amounts from the normal encoding unit 202 and the simplified encoding unit 203, determines a quantization step when the normal encoding is performed, and notifies the normal encoding unit 202 of the determined quantization step.

Figure 10:
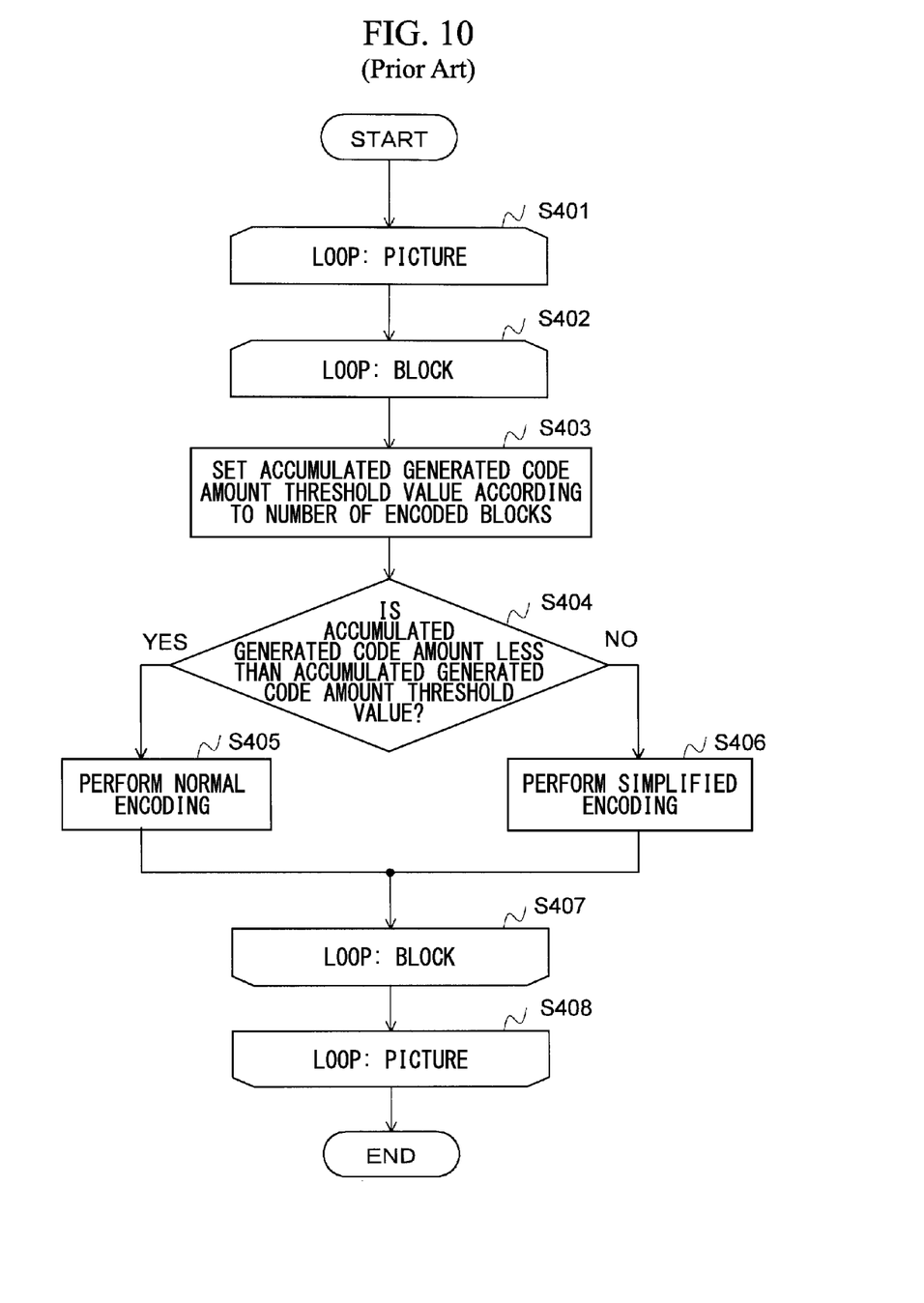
FIG. 10 is a flowchart illustrating a flow of a conventional encoding process.

FIG. 10 is a processing flowchart of a video encoding method in the conventional technology. For each input picture, the process of steps S401 to S408 is iterated. In addition, for blocks into which the picture is divided, the process of steps S402 to S407 is iterated. In step S403, an accumulated generated code amount threshold value according to the number of encoded blocks is set. In step S404, it is determined whether the previously accumulated generated code amount is less than the accumulated generated code amount threshold value set in step S403. When the previously accumulated generated code amount is less, the process proceeds to step S405. When the previously accumulated generated code amount is greater, the process proceeds to step S406. In step S405, the normal encoding is performed on an encoding target block. In step S406, the simplified encoding is performed on the encoding target block. The above process is iterated on all blocks within the picture, and a similar process is iterated on the next picture if encoding on one picture ends.

DOCUMENT OF THE PRIOR ART

Patent Document

[Patent Document 1]
Japanese Unexamined Patent Application, First Publication No. 2005-328183

DISCLOSURE OF INVENTION

Problems to be Solved by the Invention

When a method of performing encoding by separating the normal encoding and the simplified encoding in the above-described conventional technology is applied under the condition that a virtual buffer is small at a low bit rate, the simplified encoding is performed on a major portion of an intra-picture. Although the intra-picture becomes a reference picture for the inter-picture to be encoded next, picture quality is significantly degraded because the simplified encoding is performed on a major portion of the picture. Therefore, when the normal encoding is performed on the inter-picture, a large code amount occurs because a large prediction residual occurs in motion compensation. Thereby, when the accumulated generated code amount is increased, normal encoding can be performed on only part of the inter-picture, and simplified encoding is performed on a major portion. Because a state in which the simplified encoding has been performed on the large portion in this manner also continues in the next or succeeding inter-picture, the transition from the state in which the simplified encoding is performed on the major portion of the picture to the state in which the normal encoding is performed on the overall picture may not be performed (picture quality may not be restored).

Figure 11:
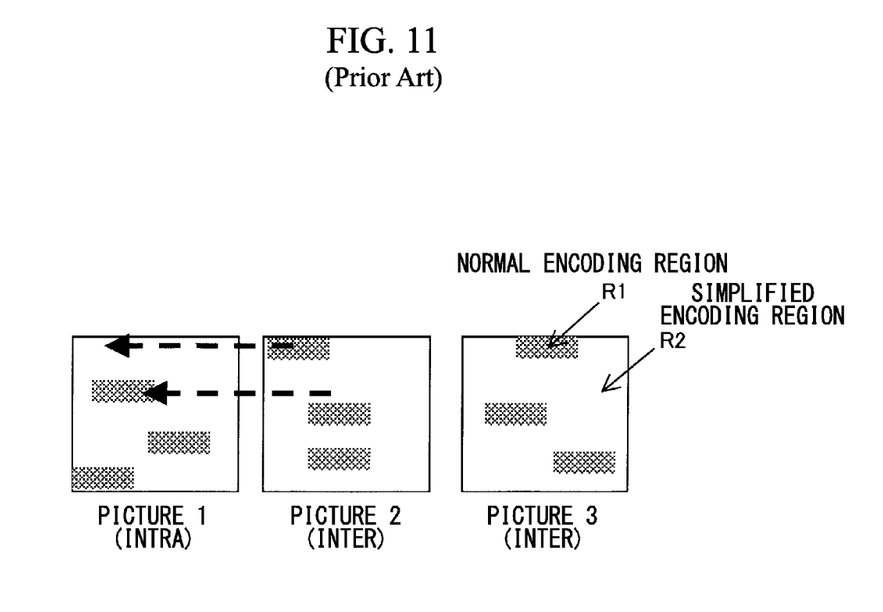
FIG. 11 is a conceptual diagram of a conventional technology.

A conceptual diagram of this situation is illustrated in FIG. 11. In FIG. 11, R1 of a hatched part is a normal encoding region and a part R2 other than the hatched part is a simplified encoding region. If the simplified encoding is performed on the large portion of the intra-picture (picture 1 of FIG. 11) as described above, picture 1 having the major portion on which the simplified encoding has been performed is assumed to be a reference picture in encoding of the next inter-picture (picture 2). Therefore, because a large prediction residual occurs in a normal encoding block on which motion compensation is performed in picture 2 by referring to a region on which the simplified encoding is performed in picture 1, a large generated code amount may be consumed and consequently the simplified encoding may also be performed on the major portion of picture 2. This continues in a picture subsequent to the next picture 2 and picture quality may not be restored. In addition, even when the normal encoding region of picture 1 is referred to in picture 2, simplified encoding may be performed because the accumulated generated code amount is large.

An encoding method according to the present invention has been made to solve the above-described problem, and an object of the present invention is to efficiently restore picture quality even from a state in which simplified encoding is frequently used after intra-picture insertion or the like.

Means for Solving the Problem

In order to solve the above-described problem, the following method is used as an encoding method according to the present invention.

[Method 1]

(1) In an intra-picture, a predetermined region is set as a normal encoding region and a region other than the predetermined region is set as a simplified encoding region.

Figure 1:
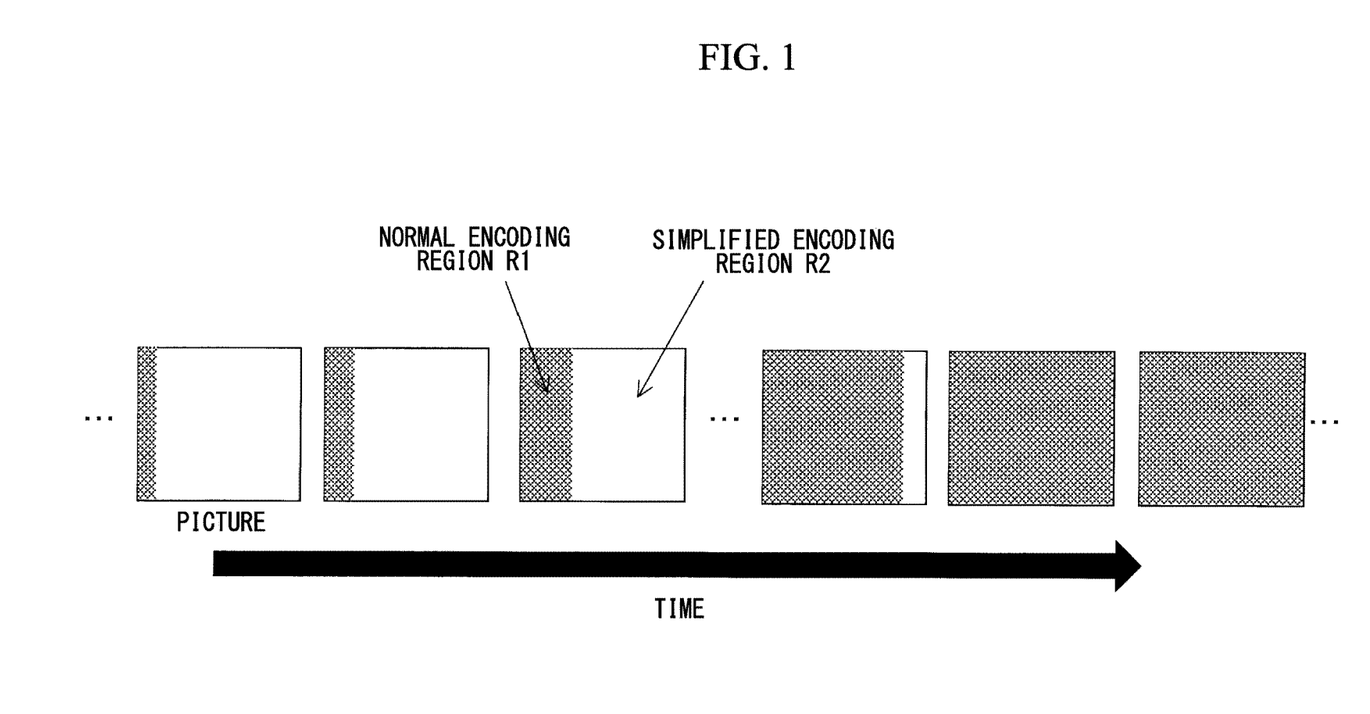
FIG. 1 is a diagram illustrating an outline of a video encoding method according to an embodiment of the present invention.

(2) In a subsequent picture, the normal encoding region is set as a larger region including a normal encoding region of a previous picture and a region other than the normal encoding region is set as the simplified encoding region (an example is illustrated in FIG. 1).

(3) In each picture, normal encoding is performed on a block of the normal encoding region and simplified encoding is performed on a block of the simplified encoding region.

In the conventional technology, when the simplified encoding is performed on the major portion of the picture in the intra-picture as described with reference to FIG. 11, a situation in which a large prediction residual occurs by referring to the simplified encoding region in motion compensation even in the next or succeeding intra-picture and the simplified encoding is performed on a large portion of the picture continues.

On the other hand, in the encoding method according to the present invention, the normal encoding region is set in the intra-picture and the normal encoding region of the next or succeeding inter-picture further includes the normal encoding region of the previous picture. A temporal correlation of pictures temporally continuous in a natural video is high. That is, a subject in the normal encoding region of the encoding target picture is likely to be present in the normal encoding region of the previous picture. Therefore, unlike the conventional technology, it is possible to reduce a prediction residual and reduce a generated code amount by referring to the normal encoding region of the previous picture in motion compensation in the normal encoding region in the encoding target picture. Thus, because it is possible to enlarge the normal encoding region for every picture and perform the normal encoding on all blocks of the picture in a predetermined cycle, it is possible to transition to a state in which the normal encoding is performed on all screens in the predetermined cycle (restore picture quality).

[Method 2]

In addition, in (3) in the above-described method 1, the picture quality is further improved when only the normal encoding region of the previous picture is set to be referred to in a block on which inter-encoding is performed in at least the normal encoding region.

The reason for this is as follows. Because it is possible to refer to the simplified encoding region of the reference picture in encoding of the normal encoding region of the picture in method 1, the degradation of picture quality may be caused by referring to the simplified encoding region according to a motion search algorithm. In method 2, it is possible to prevent picture quality from being degraded and improve the picture quality by referring to the simplified encoding region because the normal encoding region of the reference picture is necessarily referred to in the encoding of the normal encoding region of the picture.

[Method 3]

In addition, the above-described method 1 is effective in suppressing buffer underflow when a direct current (DC) component among transform coefficients of the blocks is encoded in a maximum quantization step and other transform coefficients are not encoded in the simplified encoding in the intra-picture.

In the above-described method 1, as a specific method of the simplified encoding of the intra-picture, for example, it is possible to easily infer a process of maximizing a quantization step. However, because the generated code amount is large according to an input video in the case of this method, buffer underflow is likely to occur under the condition that a buffer size is small at a low bit rate. In method 3, as a specific method of the simplified encoding of the intra-picture, only a DC component among transform coefficients of blocks is encoded in a maximum quantization step. Thus, because only one transform coefficient is encoded for each block for any input video, it is possible to suppress the buffer underflow more than in the above-described methods.

[Method 4]

In addition, when each block is encoded in the skip mode in the simplified encoding region in the inter-picture in the above-described method 1, it is possible to further suppress the buffer underflow.

In the above-described method 1, as a specific method of the simplified encoding of the inter-picture, for example, it is possible to easily infer a process of maximizing a quantization step. However, because the generated code amount is large according to an input video in the case of this method, buffer underflow is likely to occur under the condition that a buffer size is small at a low bit rate. In method 4, encoding is performed in the skip mode as a specific method of simplified encoding of an inter-picture. Thus, it is possible to suppress buffer underflow as compared to the above-described method because encoding is possible in a minimum generated code amount regardless of an input video.

[Method 5]

In addition, in (3) in the above-described method 1, at least a block of the same position as that of a simplified encoding region of the previous picture in the normal encoding region of an encoding target picture is intra-encoded. Thereby, a computation amount can be reduced.

When a general mode determination (a rate distortion cost comparison of the encoding mode) has been made in the above-described methods 1 to 5, a block of the same position as that of a simplified encoding region of the previous picture in the normal encoding region of an encoding target picture is intra-encoded in many cases. This is because, although a subject of a corresponding region of the encoding target picture is normally shown in the same position of the previous picture, simplified encoding is performed on the corresponding region of the previous picture and therefore picture quality is significantly poor and the rate distortion cost is increased when the inter-encoding is performed.

On the other hand, in method 5, because a block of the region of the same position as that of the simplified encoding region of the previous picture is intra-encoded in the normal encoding region of the encoding target picture, it is possible to eliminate a process of calculating rate distortion cost by performing inter-encoding on the block. Thus, it is possible to reduce the computation amount as compared to method 1.

[Method 6]

In addition, when a quantization step of the encoding target picture is determined in the quantization control in the above-described method 1, only the generated code amount and the quantization step of the normal encoding region of the encoded picture are used.

In the above-described method 1, a quantization control method is assumed to be arbitrary and the generated code amount and the quantization step for the overall screen of the encoded picture are used when the quantization step of the encoding target picture is determined when general quantization control is performed. Because the simplified encoding region of the encoded picture may suppress the generated code amount regardless of picture complexity, the quantization step may be extremely reduced and the possibility of buffer underflow is high.

On the other hand, if method 6 is used, the generated code amount and the quantization step of the normal encoding region of the encoded picture are used when the quantization step of the encoding target picture is determined. Thus, it is possible to prevent the quantization step of the encoding target picture from being extremely reduced and suppress the buffer underflow as compared to the above-described method.

Effects of the Invention

According to a video encoding method related to the present invention, there is an advantageous effect in that picture quality can be restored early from a state in which simplified encoding is frequently used after intra-picture insertion or the like.

Further, it is possible to improve picture quality by necessarily referring to the normal encoding region of the reference picture in encoding of the normal encoding region of the picture.

In addition, as the specific method of the simplified encoding of the intra-picture, it is possible to suppress buffer underflow by employing a method of encoding only a DC component among transform coefficients of each block in a maximum quantization step.

In addition, as the specific method of the simplified encoding of the inter-picture, it is possible to further suppress buffer underflow by employing a method of performing encoding in the skip mode.

In addition, it is possible to reduce a computation amount by performing intra-encoding on the block of the region of the same position as that of the simplified encoding region of the previous picture in the normal encoding region of the encoding target picture.

In addition, it is possible to effectively suppress buffer underflow by employing the generated code amount and the quantization step of the normal encoding region of the encoded picture when the quantization step of the encoding target picture is determined.

EMBODIMENTS FOR CARRYING OUT THE INVENTION

Hereinafter, an embodiment of encoding according to the present invention will be described using the drawings.

The use of the present invention in a television (TV) conference, which is a typical usage scene, is considered. In this system, an intra-picture is normally set as only a picture to be initially encoded so as to smooth the temporal transition of a generated code amount. Then, the intra-picture is inserted only when packet loss has been generated in a transmission destination. The encoding method according to the present invention operates at a point in time at which the intra-picture has been inserted and continues until the normal encoding region is enlarged for every picture and normal encoding is performed on the overall screen of the picture.

The encoding method according to the present invention is effective under the condition that a buffer size is small at a very low bit rate and it is difficult to perform normal encoding on a major portion of an intra-picture. Under this condition, it is necessary to reduce the normal encoding region of the intra-picture and enlarge the normal encoding region bit by bit. Because this relies upon the resolution of a picture, a frame rate, a bit rate, and a buffer size, a size of the normal encoding region is assumed to be predetermined with respect to these specific conditions and applied to the present invention.

The following conditions are considered as a typical example to which the encoding method according to the present invention is applied.

Picture resolution: 1280 pixels in width/720 pixels in height
Frame rate: 30 pictures per second
Bit rate: 500 kbps
Buffer size: 50 kbits (buffer delay is about 100 msec and becomes low delay)

FIG. 1 is a diagram illustrating an outline of a video encoding method according to an embodiment of the present invention. In each picture illustrated in FIG. 1, R1 of a hatched part represents a normal encoding region and a part R2 other than the hatched part represents a simplified encoding region.

As illustrated in FIG. 1, the normal encoding region R1 is assumed to be a region in which macroblock columns (wherein a macroblock is a block of 16×16 pixels) from the left of the picture are continuous. When encoding based on H.264 is used in the above-described conditions, it is possible to expect a state in which normal encoding is performed on all screens of pictures in 40 frames (about 1.3 sec) without causing a buffer failure by enlarging the normal encoding region for every two macroblock columns in each picture.

Figure 2:
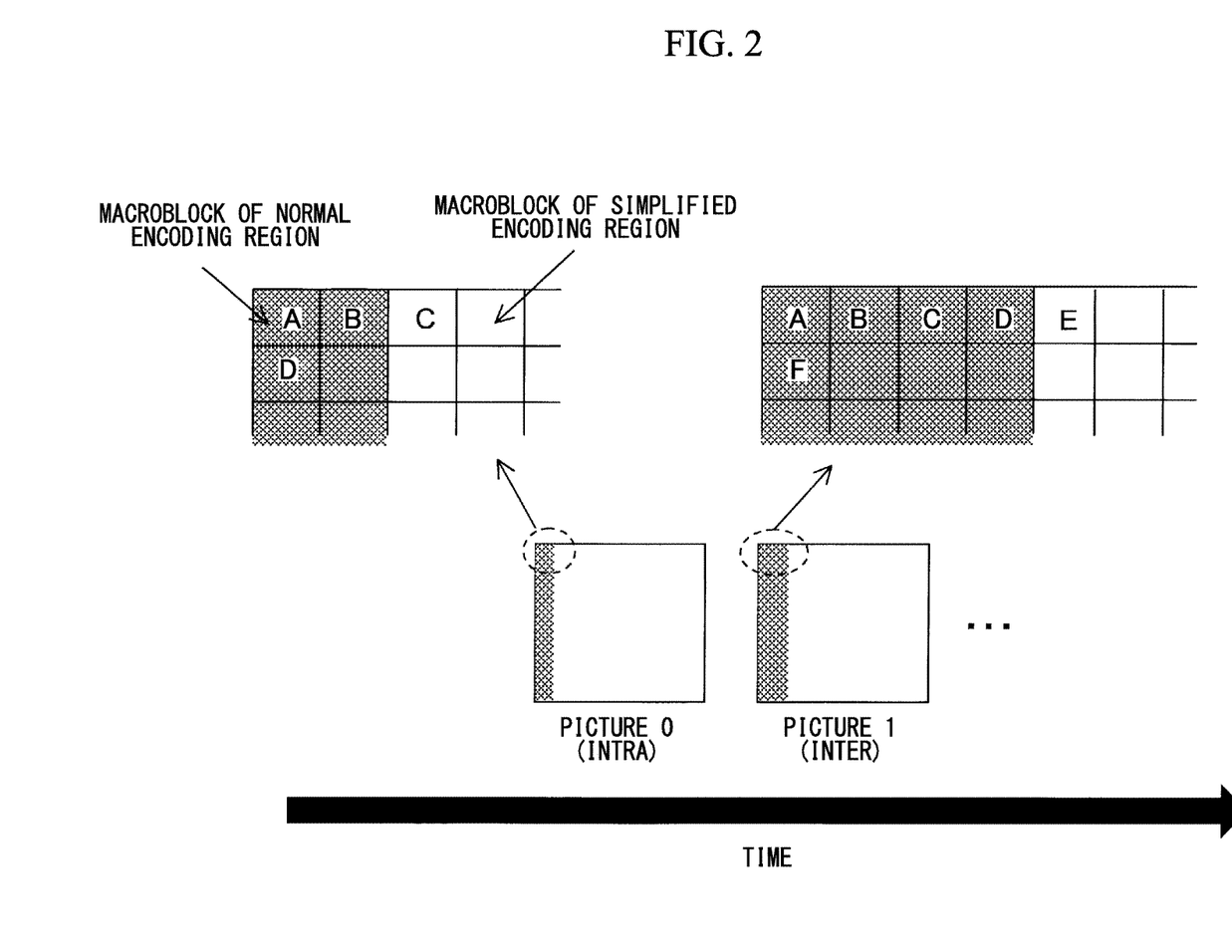
FIG. 2 is a diagram illustrating a setting example of a normal encoding region in the video encoding method according to this embodiment.

The conceptual diagram of the setting example of this normal encoding region is illustrated in FIG. 2. In FIG. 2, A, B, C, D, E, F, . . . are macroblocks.

Example 1

Figure 3:
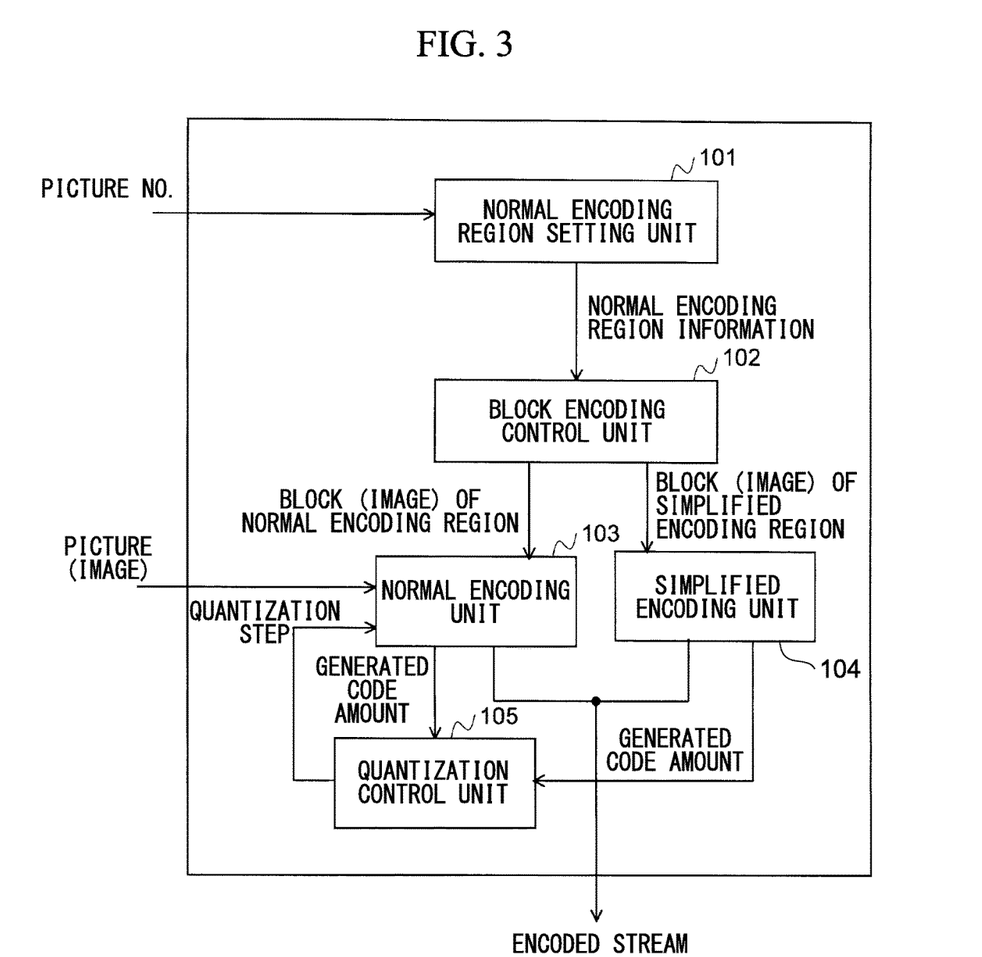
FIG. 3 is a configuration diagram of a video encoding device according to this embodiment.

FIG. 3 is a configuration diagram of a device according to example 1 of the present invention. Also, in other examples, the basic device configuration is similar to that of example 1.

A normal encoding region setting unit 101 determines which macroblock is a block on which normal encoding is performed according to a picture number, and outputs information about the determined block as normal encoding region information to a block encoding control unit 102. In example 1, as described above, the normal encoding region is enlarged by every two macroblock columns for every picture. In addition, only a first picture (whose picture No. is 0) becomes an intra-picture. Therefore, normal encoding is performed on all macroblocks from a picture whose picture No. is 40.

The block encoding control unit 102 inputs a picture and further inputs normal encoding region information corresponding to the picture. Then, in the order of raster scan, the macroblock of the picture is output to a normal encoding unit 103 if the macroblock of the picture is within a normal encoding region and is output to a simplified encoding unit 104 if the macroblock of the picture is within a simplified encoding region.

The normal encoding unit 103 is assumed to be a general H.264 encoder, and performs normal encoding on the input macroblock. That is, if the encoding target picture is an intra-picture, the determination of an intra-prediction mode, an orthogonal transform/quantization of a prediction residual signal, and entropy encoding are performed. If the encoding target picture is an inter-picture, a motion search, a mode determination, an orthogonal transform/quantization of a prediction residual signal, and entropy encoding are performed. In either thereof, a quantization step determined based on general quantization control according to a bit rate and a buffer size of a virtual buffer is used in quantization.

The simplified encoding unit 104 performs simplified encoding on the input macroblock. If the encoding target picture is an intra-picture, the intra-prediction mode is assumed to be average value prediction of 16×16 pixels and only a DC component of an orthogonal transform coefficient of the macroblock is encoded in a maximum quantization step. On the other hand, if the encoding target picture is an inter-picture, the macroblock is assumed to be in the skip mode.

A quantization control unit 105 is assumed to perform conventional general quantization control, uses a generated code amount as an input, and outputs a quantization step of a macroblock unit to the normal encoding unit.

Figure 4:
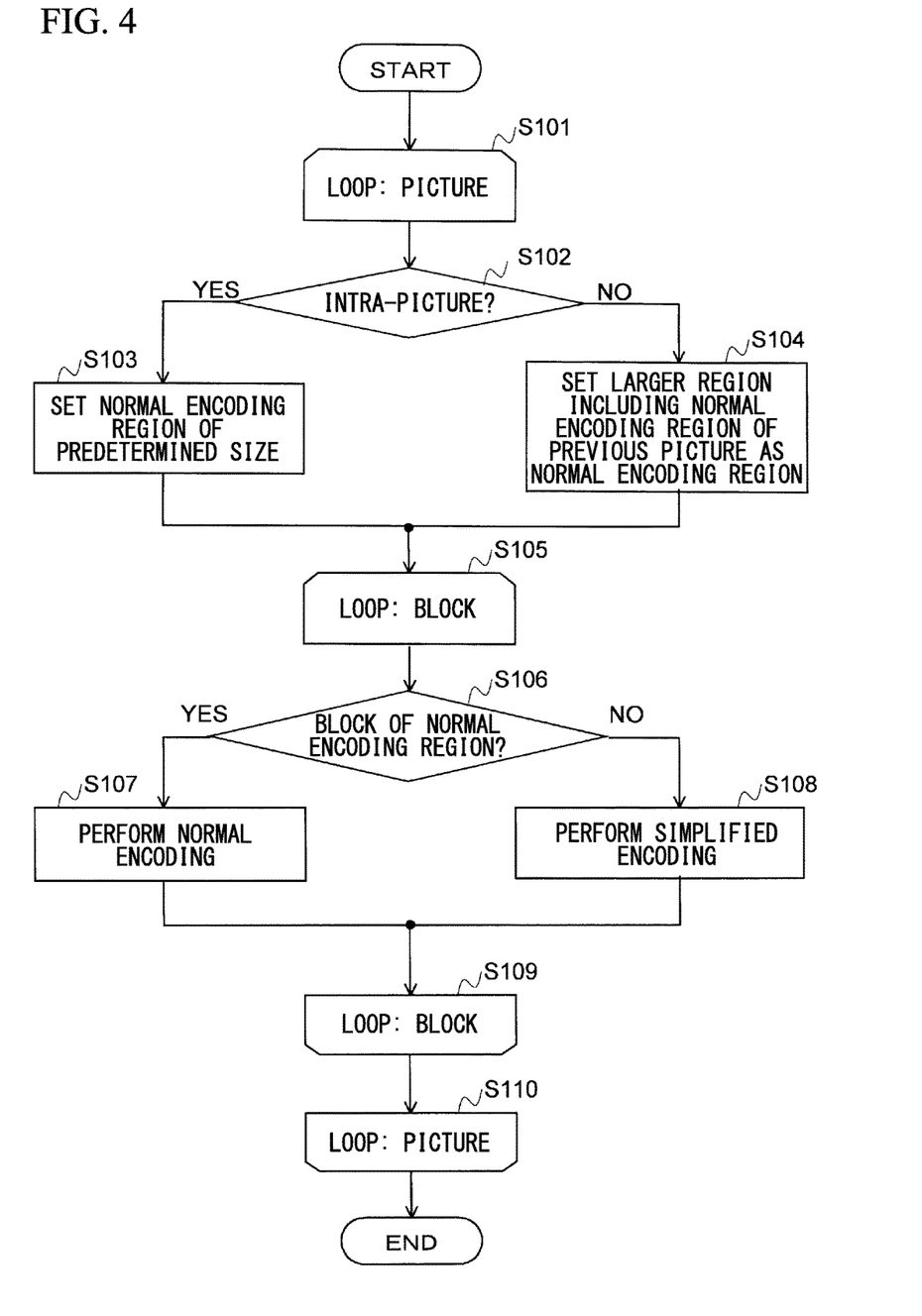
FIG. 4 is a flowchart illustrating a flow of an encoding process of example 1.

A flow of an encoding process of example 1 will be described according to steps S101 to S110 illustrated in FIG. 4.

First, description will be given from processing of an initial picture (picture No. 0). Because the picture is an intra-picture whose picture No. is 0, the normal encoding region setting unit 101 determines two macroblock columns of a left end of the picture as a normal encoding region and outputs information about the two determined macroblock columns as normal encoding region information to the block encoding control unit (S102 and S103).

The picture whose picture No. is 0 is input to the block encoding control unit 102, and macroblocks are processed in the order of raster scan based on the normal encoding region information. Initially, macroblock A of FIG. 2 is processed. Because macroblock A is within the normal encoding region, macroblock A is output to the normal encoding unit 103. The normal encoding unit 103 performs normal encoding on macroblock A.

Next, a similar process is also performed on macroblock B. Next, because macroblock C to be processed next does not belong to the normal encoding region (but belongs to the simplified encoding region), macroblock C is output to the simplified encoding unit 104. Also, because the encoding target picture is an intra-picture, the simplified encoding unit 104 sets the intra-prediction mode as average value prediction of 16×16 pixels and encodes only a DC component of an orthogonal transform coefficient of the macroblock in a maximum quantization step. If processing of a macroblock row of an upper end is completed, a similar process is performed from macroblock D (S106, S107, and S108).

Processing of the next picture (picture No. 1) will be described. Because the picture No. is 1, the normal encoding region setting unit 101 determines four macroblock columns of the left end of the picture as a normal encoding region and outputs information about the determined four macroblock columns as normal encoding region information to the block encoding control unit 102 (S102 and S103).

The picture whose picture No. is 1 is input to the block encoding control unit 102, and macroblocks are processed in the order of raster scan based on the normal encoding region information. Because macroblocks A to D are within the normal encoding region, the macroblocks are output to the normal encoding unit 103 and the normal encoding unit 103 perform is normal encoding. Because the next macroblock E does not belong to the normal encoding region, the next macroblock E is output to the simplified encoding unit 104. Also, because the encoding target picture is an inter-picture, the simplified encoding unit 104 encodes a corresponding macroblock in the skip mode. If processing of a macroblock row of an upper end is completed, a similar process is performed from macroblock F (S106, S107, and S108).

Example 2

Although the basic flow of example 2 is similar to that of example 1, the normal encoding unit 103 is slightly different. Specifically, an operation when a block is inter-encoded is different.

Figure 5:
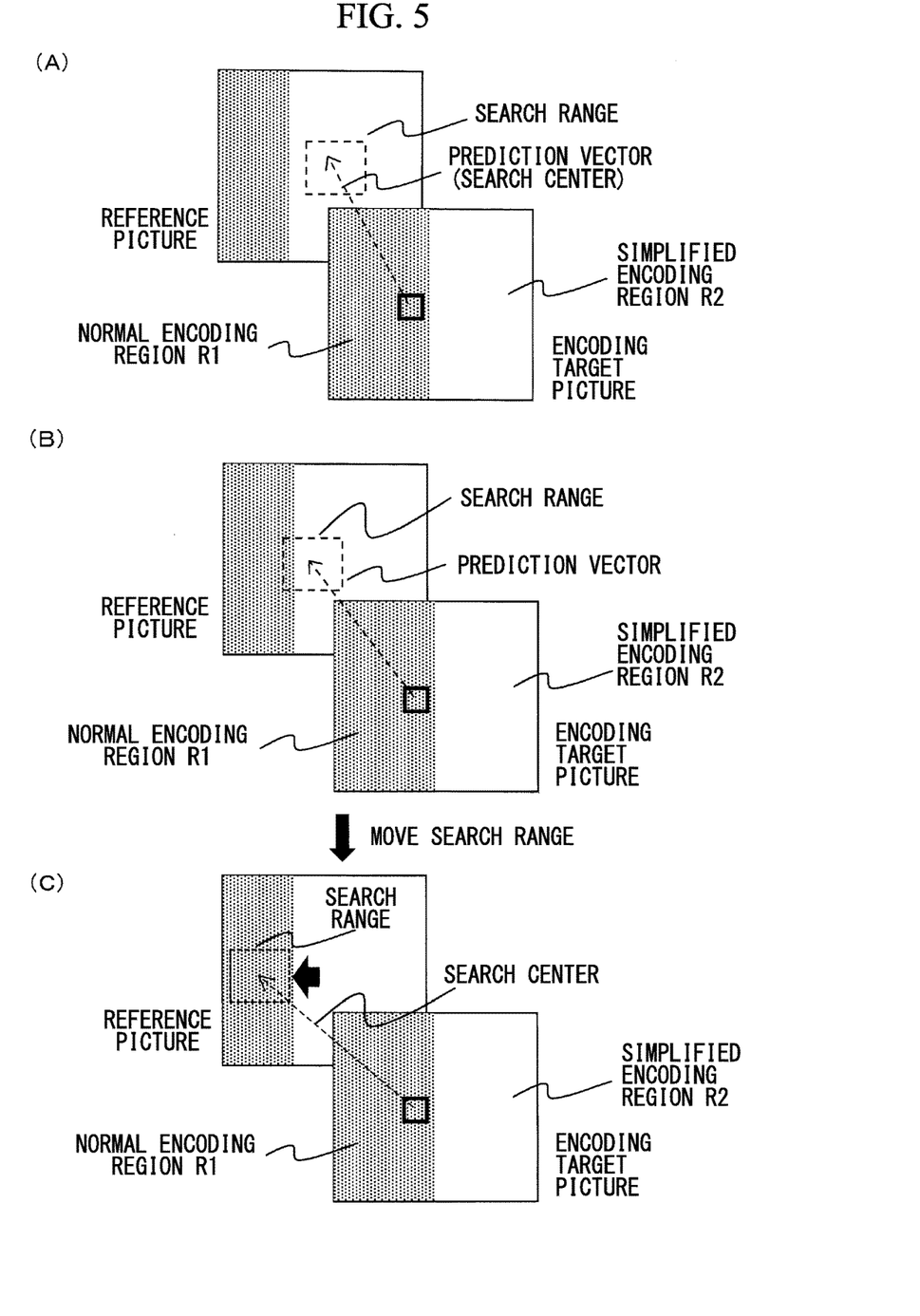
FIG. 5 is a diagram illustrating an example of a motion search in video encoding according to this embodiment.

Because the normal encoding region and the simplified encoding region in the reference picture are not considered in a motion search when a block is inter-encoded in a general H.264 encoder, inter-encoding may be performed by referring to the simplified encoding region. In general, a predetermined search range centered on a predetermined search center is searched for in the motion search. This example is illustrated in (A) of FIG. 5. In the H.264 encoder, a prediction vector may be designated as the search center. In this case, the search range is included in a simplified encoding region of the reference picture. A prediction residual for encoding the block by referring to the simplified encoding region frequently occurs. Also, a median of the motion vector around the encoding target block is normally designated as the prediction vector.

In the normal encoding unit 103 of example 2, this is avoided by performing the next operation when the block is inter-encoded.

Figure 6:
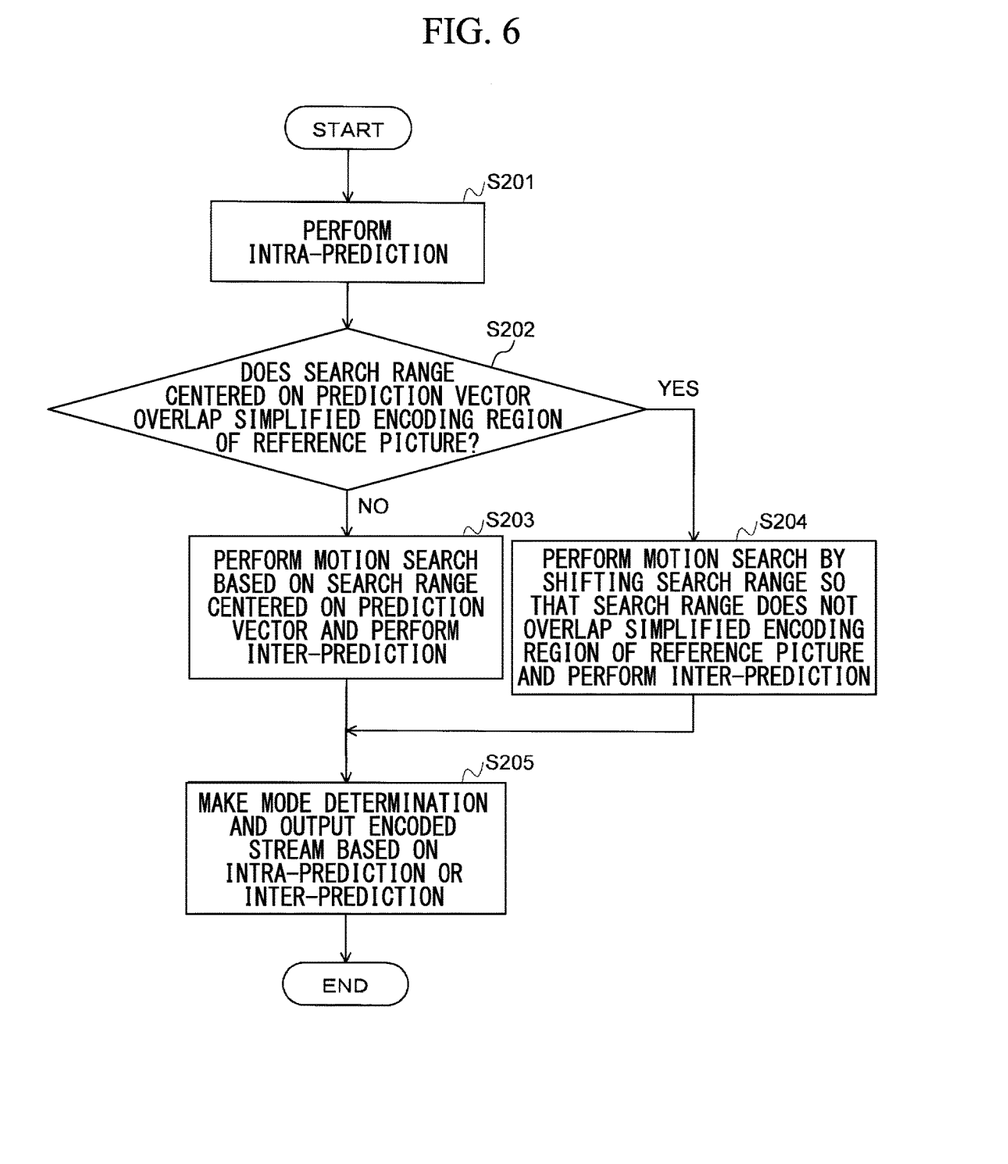
FIG. 6 is a flowchart illustrating a flow of an encoding process of example 2.

A flowchart of example 2 is illustrated in FIG. 6. First, the intra-prediction is performed (S201). Before inter-prediction, the prediction vector and the search range are calculated at the time of the motion search of the block and it is determined whether the search range overlaps the simplified encoding region (S202). When there is no overlap, the inter-prediction is performed by directly performing the motion search and the encoding process is performed (S203 and S205). On the other hand, when there is overlap (see (B) of FIG. 5), the search range horizontally moves to a region in which the search range does not overlap the simplified encoding region (see (C) of FIG. 5). Then, the inter-prediction is performed by performing the motion search in the moved search range and performing the encoding process (S204 and S205).

Example 3

Although the basic flow of example 3 is similar to that of example 1, the operation of the normal encoding unit 103 is slightly different. Specifically, an operation of encoding a macroblock of the same position as the simplified encoding region of the reference picture among macroblocks of the normal encoding region of the encoding target picture is different. This macroblock, for example, corresponds to macroblocks C and D in picture 1 of FIG. 2.

In the encoding of the macroblock, a mode determination is generally made. In the mode determination, an encoding method of comparing rate distortion cost when intra-encoding is performed to rate distortion cost when inter-encoding is performed and minimizing the rate distortion cost is selected.

Figure 7:
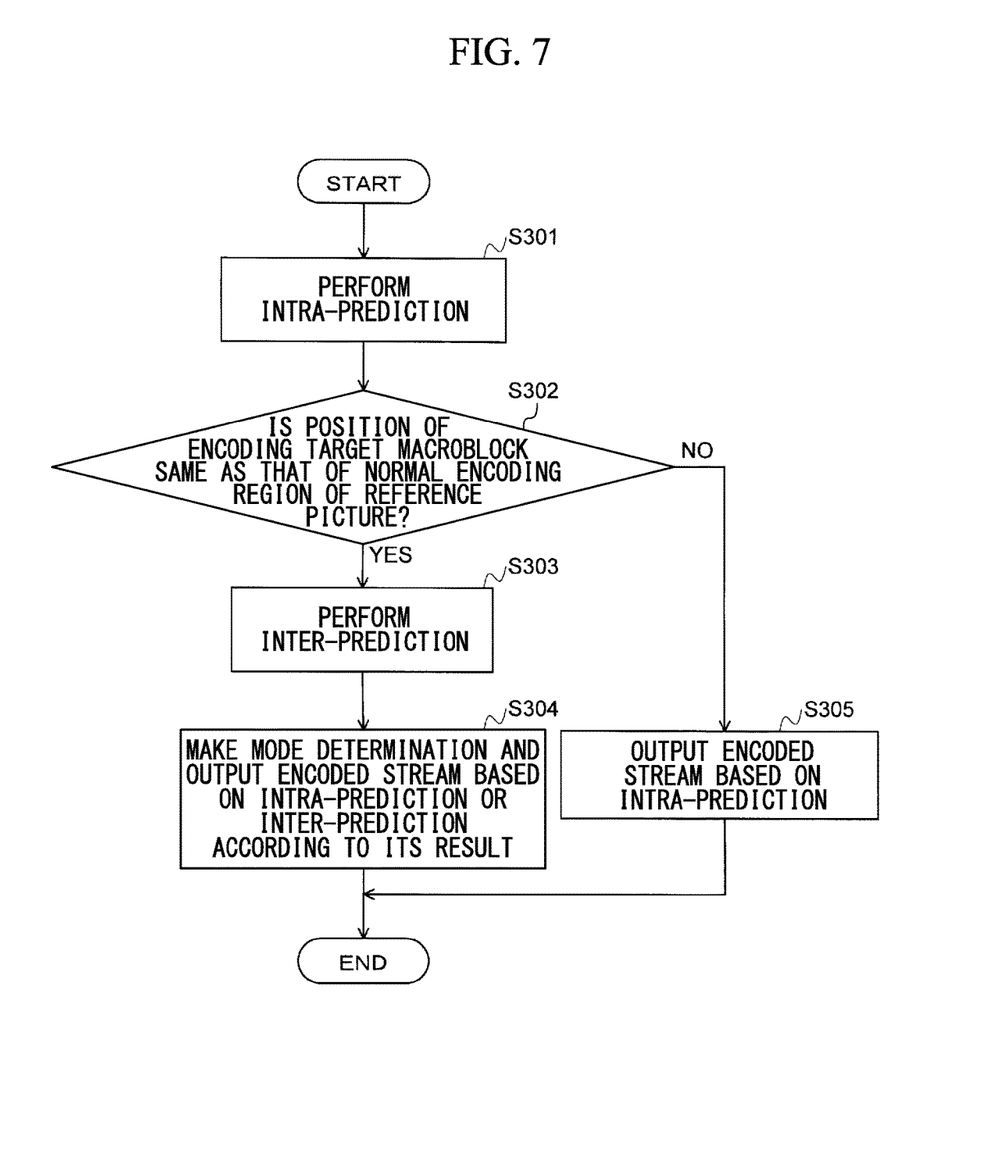
FIG. 7 is a flowchart illustrating a flow of an encoding process of example 3.

The flowchart of example 3 is illustrated in FIG. 7. First, the intra-prediction is performed (S301). The normal encoding unit 103 of example 3 determines whether a position of an encoding target macroblock is the same as that of the normal encoding region of the reference picture (S302). When the position of the encoding target macroblock is the same as that of the normal encoding region of the reference picture, the intra-prediction is performed (S303) and then encoding is performed in the encoding method determined by performing the mode determination related to the intra-encoding and inter-encoding and an encoded stream is output (S304). On the other hand, when a position of the encoding target macroblock is the same as that of the simplified encoding region of the reference picture, the encoded stream is output based on the intra-encoding without making the mode determination (S305).

Example 4

Although the quantization control unit 105 is configured to perform the conventional general quantization control in the above-described example 1, the operation of the quantization control unit 105 is different in example 4. In the conventional general quantization control, a quantization step of the encoding target picture is derived from a target code amount of the encoding target picture and a complexity index value of the encoding target picture. Specifically, the following process is performed.

The target code amount of the encoding target picture is set as T. The target code amount T is determined based on the target bit rate, the previously generated code amount, or the like. A complexity index value X of the encoding target picture is obtained based on the following equation.

$$X = G \times Q_{ave}$$

G denotes a generated code amount of the picture of the same picture type most recently encoded. On the other hand, $Q_{ave}$ is an average quantization step of the same encoded picture. A quantization step Q of the encoding target picture is determined by the following equation.

$$Q = X/T$$

The quantization step of the macroblock unit is determined by changing Q based on an accumulated generated code amount. In example 1, the generated code amount and the quantization step of the simplified encoding region are also used in the calculation of G and $Q_{ave}$. In this case, because the simplified encoding region significantly suppresses the generated code amount regardless of complexity of the picture, X may not represent complexity of the encoding target picture.

In example 4, the complexity index value A is obtained as follows. An area of the normal encoding region in the immediately previously encoded picture of the same picture type of the encoding target picture is denoted by $A_n$, a picture area is denoted by A, and A_Ratio is represented as follows.

$$A\_Ratio = A_n/A$$

The quantization control unit 105 obtains G as follows from the generated code amount $G_a$ of the encoded picture input from the normal encoding unit 103 and A_Ratio related to the encoded picture.

$$G = G_a/A\_Ratio$$

Then, $Q_{ave}$ is calculated as an average value of the quantization step used in the macroblock of the normal encoding region. The subsequent process is as described above.

The above video encoding process can also be implemented by a computer and a software program, and the program can also be recorded on a computer-readable recording medium and provided through a network.

Figure 8:
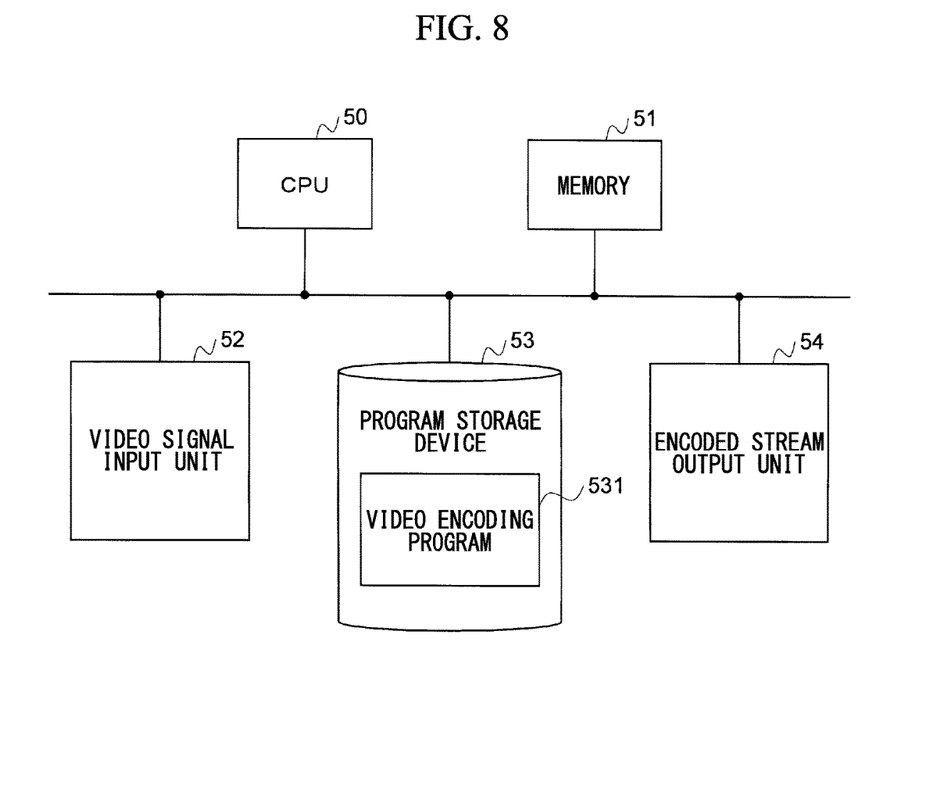
FIG. 8 is a diagram illustrating a configuration example of a system when the video encoding device according to the present invention is implemented using a computer and a software program.

In FIG. 8, a hardware configuration example when the video encoding device illustrated in FIG. 3 includes a computer and a software program is illustrated. This video encoding system is a configuration in which a central processing unit (CPU) 50 configured to execute the program, a memory 51 such as a random access memory (RAM) storing the program and data to be accessed by the CPU 50, a video signal input unit 52 (which may be a storage unit configured to store a video signal by a disc device or the like) configured to input a video signal of an encoding target from a camera or the like, a program storage device 53 configured to store a video encoding program 531, and an encoded stream output unit 54 (which may be a storage unit configured to store an encoded stream by a disc device or the like) are connected by a bus.

The CPU 50 encodes an input video signal input by the video signal input unit 52 by executing the video encoding program 531 loaded from the program storage device 53 to the memory 51, and outputs an encoded stream of an encoding result to the network or the like via the encoded stream output unit 54.

While examples 1 to 4 have been described above as the embodiments of the invention with reference to the drawings, it should be understood that these are exemplary of the invention and are not to be considered as limiting. Therefore, additions, omissions, substitutions, and other modifications can be made without departing from the spirit or scope of the present invention.

INDUSTRIAL APPLICABILITY

The present invention is applicable to video encoding for efficiently restoring picture quality from a state in which simplified encoding is frequently used after intra-picture insertion or the like.

DESCRIPTION OF REFERENCE SYMBOLS

101 Normal encoding region setting unit
102 Block encoding control unit
103 Normal encoding unit
104 Simplified encoding unit
105 Quantization control unit

The invention claimed is:

1. A video encoding method of encoding a video by using a first encoding method and a second encoding method, the video encoding method comprising:
   a process of setting a predetermined region as a first encoding region and setting a region other than the predetermined region as a second encoding region in an intra-picture;
   a process of setting the first encoding region as a larger region including a first encoding region of a previous picture and setting a region other than the first encoding region as a second encoding region in a picture subsequent to the intra-picture;
   a first encoding process of performing encoding using the first encoding method on a block of the first encoding region in each picture; and
   a second encoding process of performing encoding using the second encoding method on a block of the second encoding region in each picture,
   wherein the first encoding process comprises:
      calculating a search range in the previous picture for a block to be inter-encoded in at least the first encoding region,
      determining whether the search range overlaps the second encoding region in the previous picture,
      horizontally moving the search range to a region in which the search range overlaps only the first encoding region in the previous picture when the search range overlaps the second region in the previous picture,
      performing a motion search in the search range horizontally moved to perform an inter-prediction, and
      performing an encoding process for the block to be inter-encoded in at least the first encoding region on a basis of a result of the motion search.

2. The video encoding method according to claim 1, wherein, in the process of performing the encoding using the second encoding method, a direct current (DC) component among transform coefficients of blocks in the intra-picture is encoded in a maximum quantization step and other transform coefficients are not encoded.

3. The video encoding method according to claim 1, wherein, in the process of performing the encoding using the second encoding method, each block is encoded in a skip mode in the second encoding region in an inter-picture.

4. The video encoding method according to claim 1, wherein, in the process of performing the encoding using the first encoding method, at least a block of the same position as that of a second encoding region of the previous picture in the first encoding region of an encoding target picture is intra-encoded.

5. The video encoding method according to claim 1, wherein, in the process of performing the encoding using the first encoding method, the encoding is performed using a quantization step determined using only a generated code amount and a quantization step of the first encoding region of an encoded picture in quantization control.

6. A video encoding device for encoding a video by using a first encoding method and a second encoding method, the video encoding device comprising:
   a processor programmed to set a predetermined region as a first encoding region and set a region other than the predetermined region as a second encoding region in an intra-picture and set the first encoding region as a larger region including a first encoding region of a previous picture and set a region other than the first encoding region as a second encoding region in a picture subsequent to the intra-picture;
   a first encoder which encodes a block of the first encoding region in each picture using the first encoding method; and
   a second encoder which encodes a block of the second encoding region in each picture using the second encoding method,
   wherein the first encoder calculates a search range in the previous picture for a block to be inter-encoded in at least the first encoding region,
   wherein the first encoder determines whether the search range overlaps the second encoding region in the previous picture,
   wherein the first encoder horizontally moves the search range to a region in which the search range overlaps only the first encoding region in the previous picture when the search range overlaps the second region in the previous picture,
   wherein the first encoder performs a motion search in the search range horizontally moved to perform an inter-prediction, and
   wherein the first encoder performs an encoding process for the block to be inter-encoded in at least the first encoding region on a basis of a result of the motion search.

7. A computer program stored in a non-transitory computer-readable storage medium, comprising an instruction for causing a computer to execute the video encoding method according to claim 1.

* * * * *